(12) United States Patent
Herd et al.

(10) Patent No.: US 6,932,282 B2
(45) Date of Patent: Aug. 23, 2005

(54) WATER SUPPLY SYSTEM FOR A FUEL CELL

(75) Inventors: Gregory Herd, San Diego, CA (US); Michael Schroepel, Lenningen (DE)

(73) Assignee: Ballard Power Systems AG, Kirchheim-Nabern (DE)

( * ) Notice: Subject to any disclaimer, the term of this patent is extended or adjusted under 35 U.S.C. 154(b) by 305 days.

(21) Appl. No.: 10/024,571

(22) Filed: Dec. 21, 2001

(65) Prior Publication Data

US 2003/0116654 A1 Jun. 26, 2003

(51) Int. Cl.⁷ .................................. A62C 2/08
(52) U.S. Cl. ..................... 239/548; 239/551; 429/26
(58) Field of Search ................. 239/548, 551; 429/13, 24, 26

(56) References Cited

U.S. PATENT DOCUMENTS 3,507,702 A * 4/1970 Sanderson .................. 429/24
4,988,283 A   1/1991 Nagasawa et al.
5,432,020 A * 7/1995 Fleck ........................ 429/13
5,958,613 A * 9/1999 Hamada et al. ............ 429/26
6,126,088 A * 10/2000 Wilger et al. ............. 239/170
6,593,018 B2 * 7/2003 Ruoff et al. ................ 429/22

FOREIGN PATENT DOCUMENTS

| EP | 0 693 793 A2 | 1/1996 |
| EP | 0 980 106 A2 | 2/2000 |
| EP | 1 033 770 A1 | 9/2000 |

* cited by examiner

Primary Examiner—Dinh Q. Nguyen
(74) Attorney, Agent, or Firm—Seed IP Law Group PLLC

(57) ABSTRACT

Apparatus for supplying water to a plurality of individually controllable water injectors, has a pump adapted to provide water under pressure to the water injectors. Each water injector has associated therewith a respective controllable solenoid valve to control the amount of water supplied to the water injector, in dependence upon a pulse modulated control signal supplied to the valve.

7 Claims, 1 Drawing Sheet

WATER SUPPLY SYSTEM FOR A FUEL CELL

BACKGROUND AND SUMMARY OF THE INVENTION

1. Field of the Invention

The present invention relates to a water supply system for a fuel cell.

2. Description of the Prior Art

A known type of fuel cell utilizes a polymer electron membrane (PEM) having an anode side over which a gas flow of a fuel gas such as hydrogen passes and a cathode side over which a gas flow of an oxidant such as air passes. When an electric load is connected between the anode and cathode, hydrogen ions migrate through the membrane to generate electricity in an electrochemical reaction which drives the load. A byproduct of the electrochemical reaction is water. In order to improve the efficiency of the electrochemical reaction, the gas flows are both pressurized and humidified. An additional reason for humidifying the gases is to ensure that the membrane does not dry out since this not only leads to a reduction in the efficiency of the migration of hydrogen ions across the membrane, but can damage and reduce the service life of the membrane. One method of humidifying the gases is to inject water in the form of an atomized spray into the gas stream.

It is also necessary for the correct operation of the fuel cell to heat or cool the gases at various stages in the flow of the two gas streams to and from the fuel cell. One method of achieving this is to spray water, preferably in an atomized form, into the gas stream. It is therefore necessary to provide a multiplicity of water injection stations in the fuel cell apparatus each of which has different output requirements in terms of the volume of water which has to be injected. For the efficiency of atomization, it is necessary for the pressure of the water to be constant for a given water injector. For fuel cells operating under steady-state conditions, it is relatively easy to set each water injector with the appropriate characteristics for its particular application in the fuel cell. However, under transient conditions, such as occur when fuel cells are used in automobiles, it is not possible to set each water injector since the pressure and flow of the two gas streams and the amount of heating or cooling that the gas streams require changes rapidly depending upon the power output demands which occur under normal driving conditions.

It has been proposed for such applications to use a separate metering pump for each water injector to adjust the output of each water injector selectively depending upon the particular requirements of the parameter which it is influencing at any given time. The use of a multiplicity of separate metering pumps is costly, significant demands are made for space in the vehicle, the vehicle weight is increased, and the pumps take a relatively large amount of power to drive them.

The present invention seeks to provide apparatus for supplying the necessary water injection sprays for a fuel cell in a more cost effective, and space and power efficient manner.

BRIEF SUMMARY OF THE INVENTION

According to the present invention there is provided apparatus for supplying water to a plurality of individually controllable water injectors in a fuel cell control system, comprising a pump means adapted to supply water under pressure to said plurality of water injectors, each water injector having associated therewith a respective controllable valve to control an amount of water supply to the water injector, in dependence upon a control signal supplied to said valve.

Preferably, the pump means provides a substantially constant flow rate and pressure to a water flow passage to which each of the water injectors is connected. The water flow passage may include a pressure regulator to control the pressure in the passage and to recirculate excess water flow to the pump means.

In a preferred embodiment, the control valves each comprise a solenoid operable valve to which a control signal in the form of a pulse modulated signal is supplied to determine the opening period of the valve to meter the flow rate of water to the water injector. Preferably, the signal is a pulse width modulated (PWM) signal.

Other objects, advantages and novel features of the present invention will become apparent from the following detailed description of the invention when considered in conjunction with the accompanying drawings.

BRIEF DESCRIPTION OF THE DRAWING

The single drawing FIGURE shows in schematic form a water supply circuit for a fuel cell constructed according to the preferred embodiment of the present invention.

DETAILED DESCRIPTION OF THE INVENTION

Figure 1:
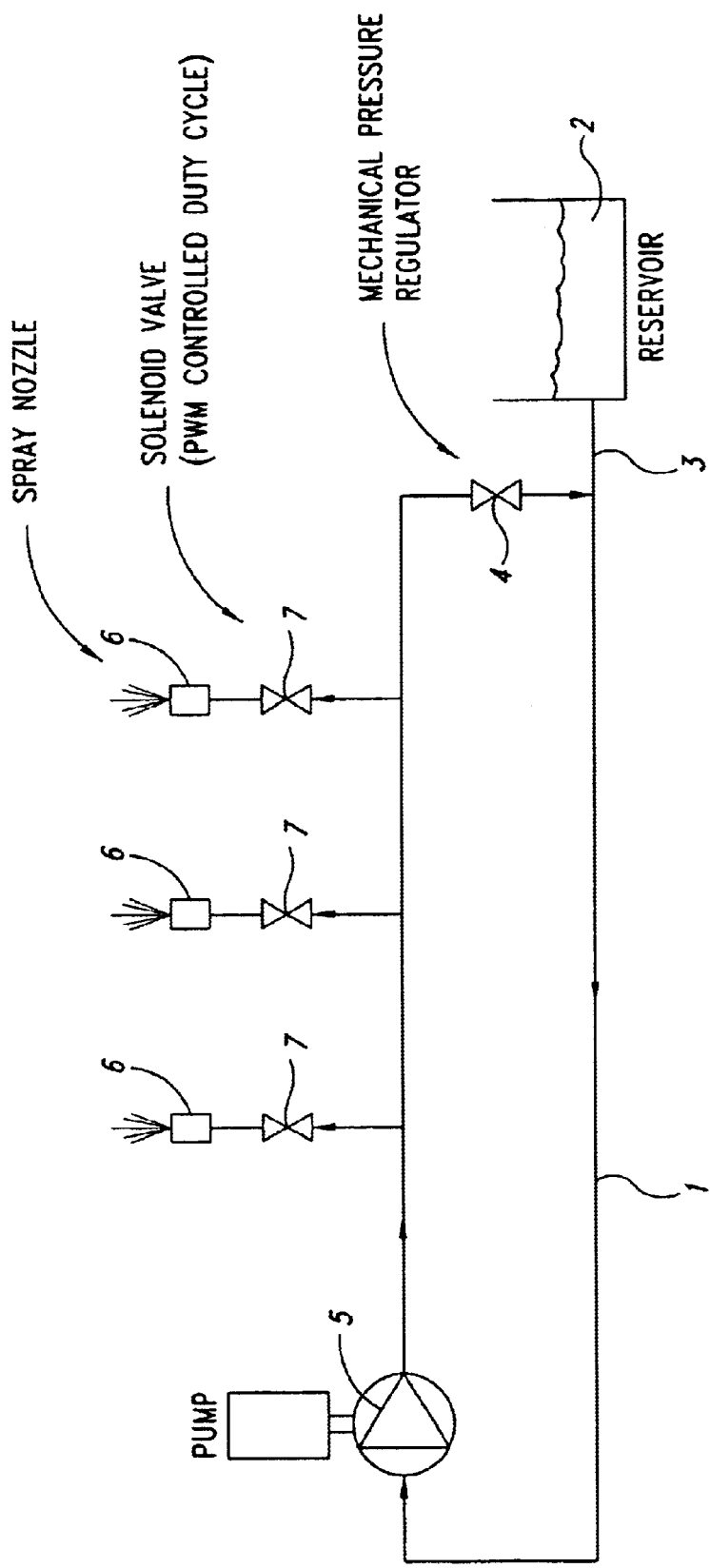

Referring to the FIGURE, the apparatus includes a water flow passage 1 connected to a reservoir 2 through a feed passage 3 to provide a supply of water to the water flow passage 1. A pump 5 provides a predetermined mass flow and pressure of water in the water flow passage 1, the pressure being regulated by a pressure regulator 4. The pressure regulator 4 also serves to direct excess water being pumped round the passage 1 back to the pump 5. A non-return valve (not shown) is located in the feed passage 3 from the reservoir 2 to prevent the excess water being pumped back to the reservoir 2. In this way, the water flow passage 1 maintains a substantially constant mass flow of water at a predetermined pressure throughout its length. At selected points along the length of the water flow passage 1 which are determined by the layout of the fuel cell control system, a plurality of water injectors in the form of fixed spray nozzles 6 tap into the water flow passage 1.

The flow of water to each spray nozzle 6 is controlled by an associated controllable solenoid valve 7 located in the water flow path between the water flow passage 1 and the spray nozzle 6. The opening times of the solenoid valves 7 are controlled by associated pulse width modulated control signals derived from sensors responsive to the requirements of the media being influenced by the respective water spray. Thus, the amount of water injected can be varied rapidly depending upon the demands. As an example, if the electrical load demand is increased the flow of hydrogen in the fuel gas stream increases accordingly and it is therefore necessary to increase the amount of water spray into the fuel gas stream entering the fuel cell to maintain the required humidity level in the gas reaching the membrane. The humidity level and the rate of flow of the hydrogen gas stream are detected by sensors and this information is fed through computerized control means to energize the solenoid valve controlling the water injector in the fuel gas stream by the required amount.

In the embodiment shown, three spray nozzles 6 are illustrated which could be connected, respectively, into the fuel gas stream, the air gas stream and a heat exchanger. The use of pulse width modulated controlled solenoid valves controls the mass flow rate of water supplied to the nozzle but ensures that the pressure of the water supplied to the nozzle remains substantially constant. In this way, the efficiency of atomization of the water spray by the nozzle is not impaired.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for supplying water to a plurality of individually controllable water injectors in a fuel cell control system, comprising a pump means adapted to provide water under pressure to said plurality of water injectors, each water injector having associated therewith a respective controllable valve to control an amount of water supplied to the water injector, in dependence upon a control signal supplied to said valve, wherein the pump means provides a substantially constant flow rate and pressure of water to a water flow passage to which each of the water injectors is connected, and wherein the water flow passage includes a pressure regulator to control pressure in the passage and to recirculate excess water flow to the pump means.

2. The apparatus according to claim 1, wherein the control valves each comprise a solenoid operable valve to which a control signal in the form of a pulse modulated signal is supplied to determine an opening period of the valve to meter the flow rate of water to the associated water injector.

3. The apparatus according to claim 2, wherein the control signal is a pulse width modulate (PWM) signal.

4. An apparatus for supplying water to a plurality of individually controllable water injectors in a fuel cell control system, comprising a pump means adapted to provide water under pressure to said plurality of water injectors, each water injector having associated therewith a respective controllable valve to control an amount of water supplied to the water injector, in dependence upon a control signal supplied to said valve, wherein the control valves each comprise a solenoid operable valve to which a control signal in the form of a pulse modulated signal is supplied to determine an opening period of the valve to meter the flow rate of water to the associated water injector.

5. The apparatus according to claim 4, wherein the pump means provides a substantially constant flow rate and pressure of water to a water flow passage to which each of the water injectors is connected.

6. The apparatus according to claim 5, wherein the water flow passage includes a pressure regulator to control pressure in the passage and to recirculate excess water flow to the pump means.

7. The apparatus according to claim 4, wherein the control signal is a pulse width modulate (PWM) signal.

* * * * *